(12) United States Patent
Bobbin et al.

(10) Patent No.: US 8,922,159 B2
(45) Date of Patent: *Dec. 30, 2014

(54) BATTERY PACK FOR POWERING MINER'S CAP LAMP

(71) Applicant: Koehler-Bright Star, Inc., Hanover Township, PA (US)

(72) Inventors: Joseph Bobbin, Nanticoke, PA (US); Mark Dirsa, Shavertown, PA (US)

(73) Assignee: Koehler-Bright Star, Inc., Hanover Township, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/779,087

(22) Filed: Feb. 27, 2013

(65) Prior Publication Data

US 2013/0241487 A1   Sep. 19, 2013

Related U.S. Application Data

(63) Continuation of application No. 12/008,790, filed on Jan. 14, 2008, now Pat. No. 8,729,851.

(60) Provisional application No. 60/880,330, filed on Jan. 12, 2007.

(51) Int. Cl.
    *H02J 7/00* (2006.01)
    *F21V 21/084* (2006.01)

(52) U.S. Cl.
    CPC ............. *H02J 7/0042* (2013.01); *H02J 7/0031* (2013.01); *H02J 7/0029* (2013.01)
    USPC ............ 320/107; 320/134; 320/136; 362/106

(58) Field of Classification Search
    USPC .......... 320/107, 128, 134–136; 362/105, 106, 362/164
    See application file for complete search history.

(56) References Cited

U.S. PATENT DOCUMENTS

| 1,389,174 | A | 9/1921 | Grant |
| 2,427,639 | A | 9/1947 | Weida |
| 2,730,561 | A | 1/1956 | Cuff |

(Continued)

FOREIGN PATENT DOCUMENTS

| CN | 1558137 | 12/2004 |
| EP | 0881740 | 12/1998 |

(Continued)

OTHER PUBLICATIONS

English Language Abstract and Translation of JP 2005-32664 published on Feb. 3, 2005.

(Continued)

*Primary Examiner* — Richard V Muralidar
(74) *Attorney, Agent, or Firm* — R. Blake Johnston; DLA Piper LLP (US)

(57) ABSTRACT

A battery pack features a housing with a battery cell positioned within the housing. A pair of terminals attached to the battery cell and are adapted to provide power to a cap lamp and/or other device(s). Charging circuitry is positioned within the housing and attached to the battery cell. The charging circuitry provides a charging current to the battery cell when the battery pack is connected to a charger. A microprocessor is positioned within the housing and operatively connected to the charging circuitry.

10 Claims, 13 Drawing Sheets

(56) References Cited

U.S. PATENT DOCUMENTS

| | | | |
|---|---|---|---|
| 3,067,905 A | 12/1962 | Ehret | |
| 3,201,284 A | 8/1965 | Ellis | |
| 3,215,304 A | 11/1965 | Karol | |
| 3,723,947 A | 3/1973 | Lozeau | |
| 4,275,131 A | 6/1981 | Richards | |
| 4,317,162 A | 2/1982 | Richards et al. | |
| 4,395,672 A | 7/1983 | Gassaway | |
| 4,444,853 A | 4/1984 | Halsall et al. | |
| 4,469,765 A | 9/1984 | McCartney et al. | |
| 4,481,458 A * | 11/1984 | Lane | 320/112 |
| 5,115,382 A * | 5/1992 | Smith | 362/105 |
| 5,192,905 A | 3/1993 | Karlin et al. | |
| 5,198,743 A | 3/1993 | McClure et al. | |
| 5,477,124 A | 12/1995 | Tamai | |
| 5,486,432 A | 1/1996 | Sharrah et al. | |
| 5,581,170 A | 12/1996 | Mammano et al. | |
| 5,585,994 A | 12/1996 | Tamai et al. | |
| 5,610,495 A | 3/1997 | Yee et al. | |
| 5,629,105 A | 5/1997 | Matthews | |
| 5,686,202 A | 11/1997 | Hooke et al. | |
| 5,747,969 A * | 5/1998 | Tamai | 320/141 |
| 5,818,198 A * | 10/1998 | Mito et al. | 320/112 |
| 5,818,201 A | 10/1998 | Stockstad et al. | |
| 5,906,505 A | 5/1999 | McCurdy et al. | |
| 5,920,181 A | 7/1999 | Alberkrack et al. | |
| 5,929,600 A | 7/1999 | Hasegawa | |
| 6,023,146 A | 2/2000 | Casale et al. | |
| 6,046,575 A | 4/2000 | Demuro | |
| 6,198,250 B1 | 3/2001 | Gartstein et al. | |
| 6,208,117 B1 | 3/2001 | Hibi | |
| 6,242,891 B1 | 6/2001 | Parsonage | |
| 6,313,610 B1 | 11/2001 | Korsunsky | |
| 6,373,226 B1 | 4/2002 | Itou et al. | |
| 6,426,612 B1 | 7/2002 | Rozsypal | |
| 6,456,038 B1 | 9/2002 | Anton et al. | |
| 6,472,097 B1 | 10/2002 | Ohbayashi et al. | |
| 6,580,250 B1 | 6/2003 | Stellberger et al. | |
| 6,617,973 B1 | 9/2003 | Osterman | |
| 6,693,408 B2 | 2/2004 | Rodriguez et al. | |
| 6,828,764 B2 | 12/2004 | Takimoto et al. | |
| 6,859,014 B2 * | 2/2005 | Bohne et al. | 320/148 |
| 6,877,875 B2 | 4/2005 | Yu et al. | |
| 6,891,353 B2 | 5/2005 | Tsukamoto et al. | |
| 6,908,208 B1 * | 6/2005 | Hyde et al. | 362/105 |
| 6,948,975 B1 | 9/2005 | Leung et al. | |
| 6,965,213 B2 | 11/2005 | Schadoffsky et al. | |
| 6,992,463 B2 | 1/2006 | Yoshio | |
| 7,161,326 B2 | 1/2007 | Kubota et al. | |
| 7,210,810 B1 * | 5/2007 | Iversen et al. | 362/105 |
| 7,602,146 B2 * | 10/2009 | Carrier et al. | 320/120 |
| 7,722,205 B2 * | 5/2010 | Kim | 362/106 |
| 8,729,851 B2 * | 5/2014 | Bobbin et al. | 320/107 |
| 2002/0089318 A1 | 7/2002 | Armstrong et al. | |
| 2002/0182929 A1 | 12/2002 | Chang et al. | |
| 2003/0067283 A1 | 4/2003 | Takimoto et al. | |
| 2003/0096160 A1 | 5/2003 | Sugiura et al. | |
| 2003/0132732 A1 | 7/2003 | Thomas et al. | |
| 2003/0205987 A1 | 11/2003 | Barlev et al. | |
| 2003/0227275 A1 | 12/2003 | Kishi et al. | |
| 2004/0036444 A1 | 2/2004 | Oogami | |
| 2004/0257036 A1 | 12/2004 | Kim | |
| 2005/0024864 A1 | 2/2005 | Galli | |
| 2005/0078024 A1 | 4/2005 | Harrington | |
| 2005/0127871 A1 | 6/2005 | Orikasa | |
| 2005/0127878 A1 | 6/2005 | Geren et al. | |
| 2005/0208369 A1 | 9/2005 | Puhlick et al. | |
| 2005/0225299 A1 | 10/2005 | Petrovic | |
| 2005/0237032 A1 | 10/2005 | Tan et al. | |
| 2006/0003192 A1 | 1/2006 | Lim | |
| 2006/0076923 A1 | 4/2006 | Eaves | |
| 2006/0088761 A1 | 4/2006 | Ota et al. | |
| 2006/0091849 A1 | 5/2006 | Huynh et al. | |
| 2006/0147764 A1 | 7/2006 | Nishimura et al. | |
| 2006/0203477 A1 | 9/2006 | Chien | |
| 2007/0026296 A1 | 2/2007 | Byun et al. | |
| 2007/0029972 A1 | 2/2007 | Lampe-Onnerud et al. | |
| 2007/0217188 A1 | 9/2007 | Klipstein et al. | |
| 2007/0236920 A1 | 10/2007 | Snyder | |

FOREIGN PATENT DOCUMENTS

| | | |
|---|---|---|
| EP | 1317042 | 6/2003 |
| GB | 2192102 | 12/1987 |
| JP | 2005-32664 | 2/2005 |
| WO | WO 00/16462 | 3/2000 |
| WO | WO 2006/025757 | 3/2006 |

OTHER PUBLICATIONS

"A Lithium-Ion Battery Charged for Charging up to Eight Cells", source(s) IEEE.
"Safety circuits for modern batteries", sources(s): BatteryUniversity.com, Apr. 2003.
Australian Office Action issued in AU 2014202891 on Sep. 5, 2014.

* cited by examiner

BATTERY PACK FOR POWERING MINER'S CAP LAMP

CLAIM OF PRIORITY

This application is a continuation of U.S. application Ser. No. 12/008,790, filed Jan. 14, 2008, which claims the benefit of and priority from U.S. Provisional Patent Application Ser. No. 60/880,330, filed Jan. 12, 2007.

FIELD OF THE INVENTION

The invention relates generally to battery packs and, more particularly, to a battery pack that features a durable construction and operation directed by an electronic control module.

BACKGROUND OF THE INVENTION

Rechargeable battery packs find use in many industrial applications due to their portability, dependability and low maintenance cost. A common usage of rechargeable battery packs is to power lamps mounted on hard hats worn by miners. Such cap lamps provide illumination in underground mine shafts. Cap lamps are well known in the mining equipment industry and provide illumination while the miner's hands remain free to perform tasks.

The battery pack is typically secured to the user's waist and electrical wiring delivers power from the battery pack to the lamp on the helmet. Normally, at the end of each working shift, the helmet and battery pack are removed by the miner and the battery pack is placed in a recharging device so that it is ready for use during a future shift. An example of such a cap lamp and rechargeable battery pack arrangement is disclosed in U.S. Pat. No. 4,481,458 to Lane.

Lithium-ion (Li-ion) batteries have a higher energy-to-weight ratio then any other commercially available rechargeable batteries. This makes them very desirable as a power source for portable devices, such as cap lamps. Most Li-ion battery packs, including those used to power mining cap lamps, must have a safety protection circuit to protect them from over-voltage, under-voltage and over-discharge conditions.

In addition, Li-ion battery packs often feature an electronic control module in series between the batteries and the cap lamp (or other load) to control operation of the battery pack. Such electronic control modules may include circuitry or a microprocessor that functions to provide an indication of a low battery, control battery charging and other functions. A need exists, however, for a low battery indicator that is easier to detect and that provides extended cap lamp operation so that a mine may be exited.

Electronic control modules may also cause a Li-ion battery pack to go into protection mode in the event of a short circuit. Such short circuits may be caused by, for example, worn parts in the cap lamp assembly or wires leading thereto. When the battery pack goes into protection mode, the cap lamp (or other load) is automatically turned off. Prior art designs require the user to manually turn the lamp off and then back on to reset the electronic control module or other circuitry and allow current to resume flow to the cap lamp after the short circuit condition is removed. An electronic control module that automatically turns the lamp (or other load) back on when the short circuit condition is removed is desirable.

A mine provides a very harsh atmosphere for equipment, including battery packs. The mine atmosphere contains an abundance of dirt, dust, coal particles and moisture. In addition, there is always the potential of a build-up of explosive gases in a mine. As a result, it is important to effectively seal a battery pack so that harmful elements can't reach the battery or the related wiring and circuitry inside. Furthermore, battery packs used in mines may suffer mechanical abuses during use as they are banged against machinery and rock, dropped and/or jostled as they ride on the user's waist. As a result, a need exists for a battery pack that can withstand shocks and vibrations.

DETAILED DESCRIPTION OF EMBODIMENTS

While the battery pack of the invention is described below in terms of use in powering a cap lamp of the type used in the mining industry, it may find application in other industries with other battery-powered devices. Indeed, the electronic control module of the invention may be integrated into a battery-powered device itself or a load attached to the battery pack, instead of a separate battery pack. In addition, while the battery pack described below features Lithium-ion (Li-ion) battery cells, the battery pack of the invention may feature other types of battery cells.

Figure 1:
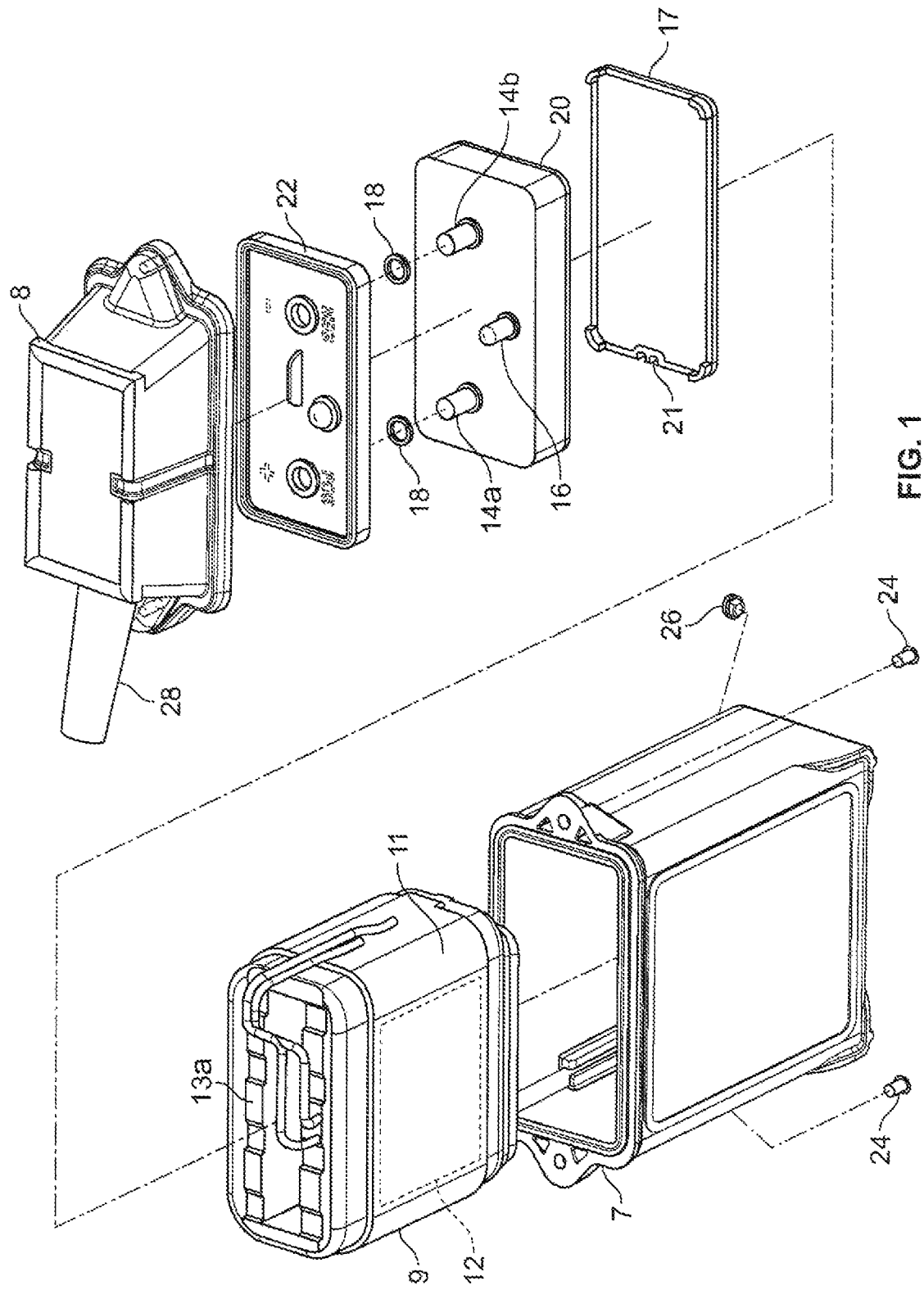
FIG. 1 is an exploded top front perspective view of a battery pack including an embodiment of the electronic control module of the present invention.
Figure 4:
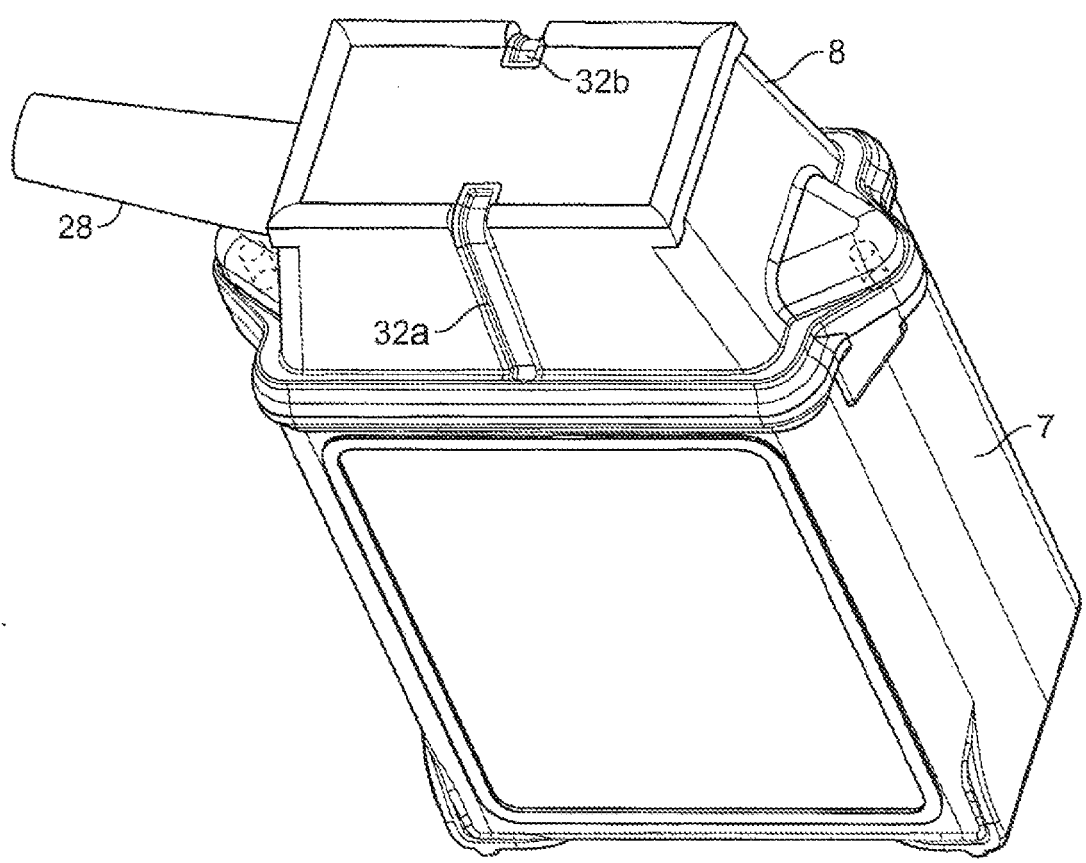
FIG. 4 is a perspective view of the battery pack of FIG. 1 after being assembled.

An embodiment of the battery pack of the present invention is illustrated in an exploded view in FIG. 1. The battery pack includes a battery housing or jar 7, that is preferably made of polycarbonate, with an open top end. A cover 8, also preferably made of polycarbonate, removably covers the open top of the battery jar, as illustrated in FIG. 4.

As illustrated in FIG. 1, a battery cell bundle 9 is positioned within the battery jar 7. The bundle features battery cells, indicated at 10 in FIGS. 2 and 3, wrapped with a foam vibration-reducing wrap 11. The foam wrap is preferably composed of neoprene and ethylene propylene diene monomer (EPDM) and is preferably approximately 2"×7.5"×1/16" thick. In addition, a pair of pads, one of which is indicated in phantom at 12 in FIG. 1, are positioned on opposite sides of the bundle, between the cells and wrap. Each pad 12 is preferably constructed from the same material as the wrap and is preferably approximately 1.25"×2.5"×1/16" thick.

Figure 2:
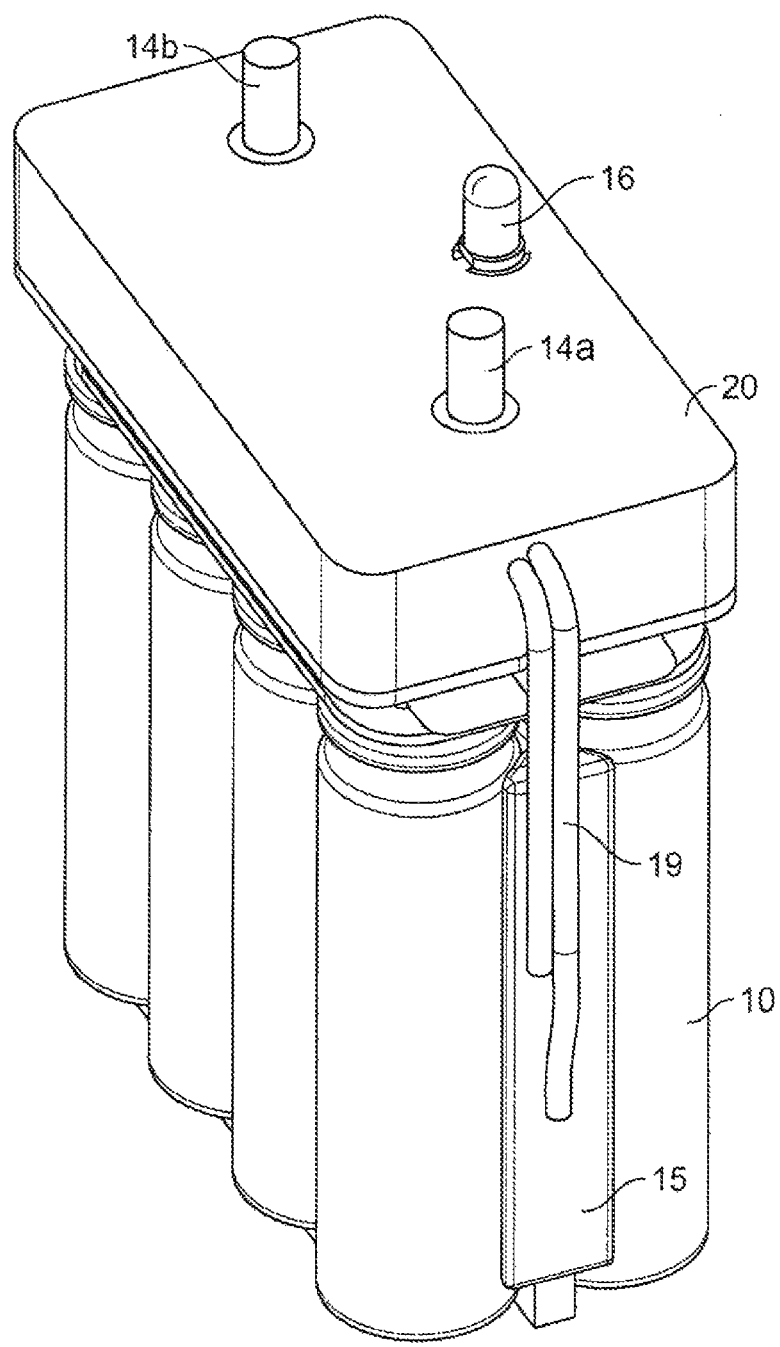
FIG. 2 is a perspective view of the battery cell bundle without a wrap or pads with an electronic control module and protection circuit assembled thereto.
Figure 3:
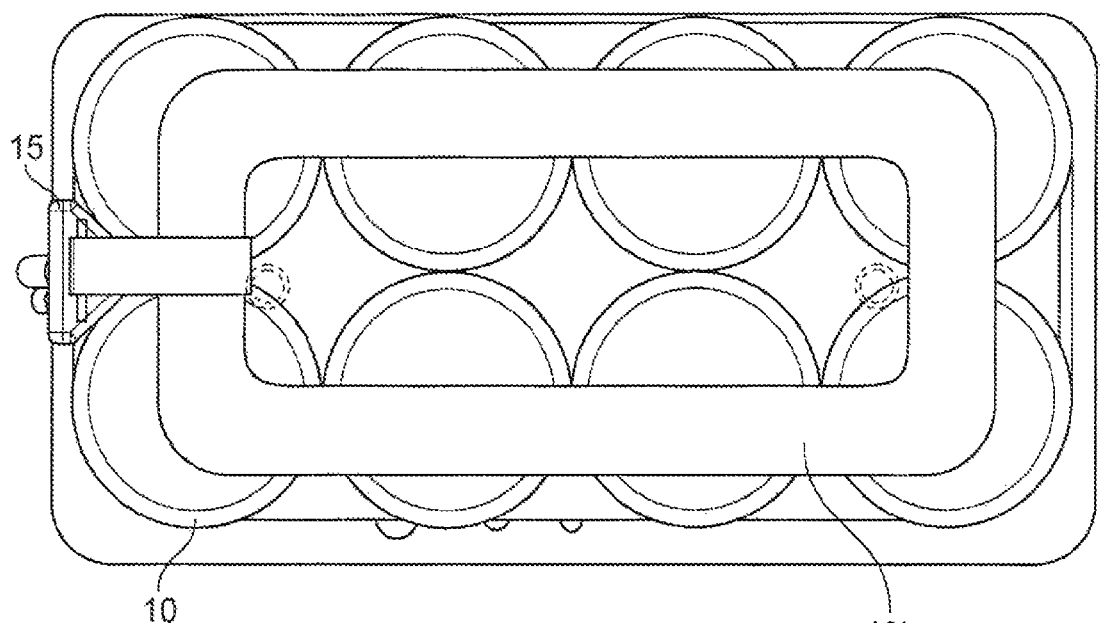
FIG. 3 is a bottom plan view of the battery cell bundle of FIG. 2.

Enlarged views of the battery cell bundle 9 of FIG. 1 with the wrap and pads (11 and 12 in FIG. 1) removed are provided in FIGS. 2 and 3. While eight battery cells 10 are illustrated, the battery pack could include an alternative number of cells. In addition, the cells preferably are Li-ion battery cells. As an example only, the battery pack may have a maximum voltage of 4.2 Volts DC and a minimum voltage of 2.5 Volts (V) DC. The battery pack may discharge at up to 2 amp, and may charge at up to 2.5 amp (A), also as an example only. The terminals of the battery cells 10 engage contact plates 13a (FIG. 1) and 13b (FIG. 3) which, as will be explained in greater detail below, are joined to a protection circuit, illustrated at 15 in FIGS. 2 and 3.

As illustrated in FIG. 1, a separator plate 17 (preferably also made of polycarbonate) is positioned over the battery cell bundle 9 so that a battery compartment is formed below and is secured within the battery jar 7 by adhesive, preferably so that the edges seal against the interior walls of the battery jar 7. As a result, an electronic control module compartment is defined within the jar or housing 7 above the separator plate. An electronic control module (ECM) 20, which contains circuitry and a microprocessor, as described in greater detail below, is positioned on top of the separator plate 17, and communicates with the protection circuit 15 of FIGS. 2 and 3, and thus the battery cell bundle 9, via a pair of wires 19 (FIG. 2) that travel through notches 21 (FIG. 1) of separator plate 17. The circuitry and microprocessor of the ECM is preferably potted in a potting compound for protection. Potting compounds for circuitry and the like are well known in the art.

The protection circuit 15 of FIGS. 2 and 3 is in circuit with the wires leading from the battery pack to the ECM and provides under-voltage cutoff over-voltage cutoff and over-current cutoff protection. The protection circuit may be a standard, off-the-shelf circuit, such as the VC3053 from Venture Inc. As illustrated in FIGS. 2 and 3, the protection circuit 15 preferably is housed in a box-like structure composed of thermally conductive potting compound. This protects the printed circuit board and components from stress and vibration.

As illustrated in FIGS. 1 and 2, the ECM 20 includes positive and negative posts 14a and 14b and a charging status light emitting diode (LED) 16. As illustrated in FIG. 1, a pair of O-ring seals 18 are positioned over the positive and negative posts of the ECM 20 so that they are sandwiched, and thus form a seal, between the top surface of the ECM 20 and the bottom surface of the battery post holder 22.

The battery jar 7 and battery post holder 22 are preferably sonically welded together to seal the battery cell bundle, ECM, and other internal components inside the battery jar where they are protected from dirt and moisture. The cover 8 is reversible and secured to the battery jar 7 with cover hold down screws 24 (FIG. 1) and a gasket, which may be molded into the cover 8, for easy service and removal as well as effective sealing. The back side of the battery jar may be provided with a clip (not shown) so that the battery pack may be mounted on the belt of a user and may also feature a plug 26 (FIG. 1) that seals a corresponding hole formed in the battery jar 7 so as to serve as a pressure relief valve.

Figure 14:
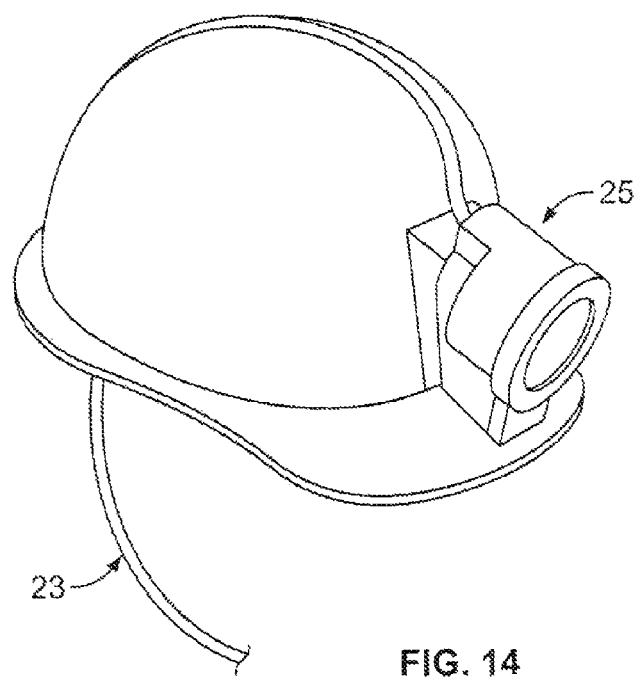
FIG. 14 is a perspective view of a cap lamp and associated components suitable for use with an embodiment of the battery pack of the invention.
Figure 15:
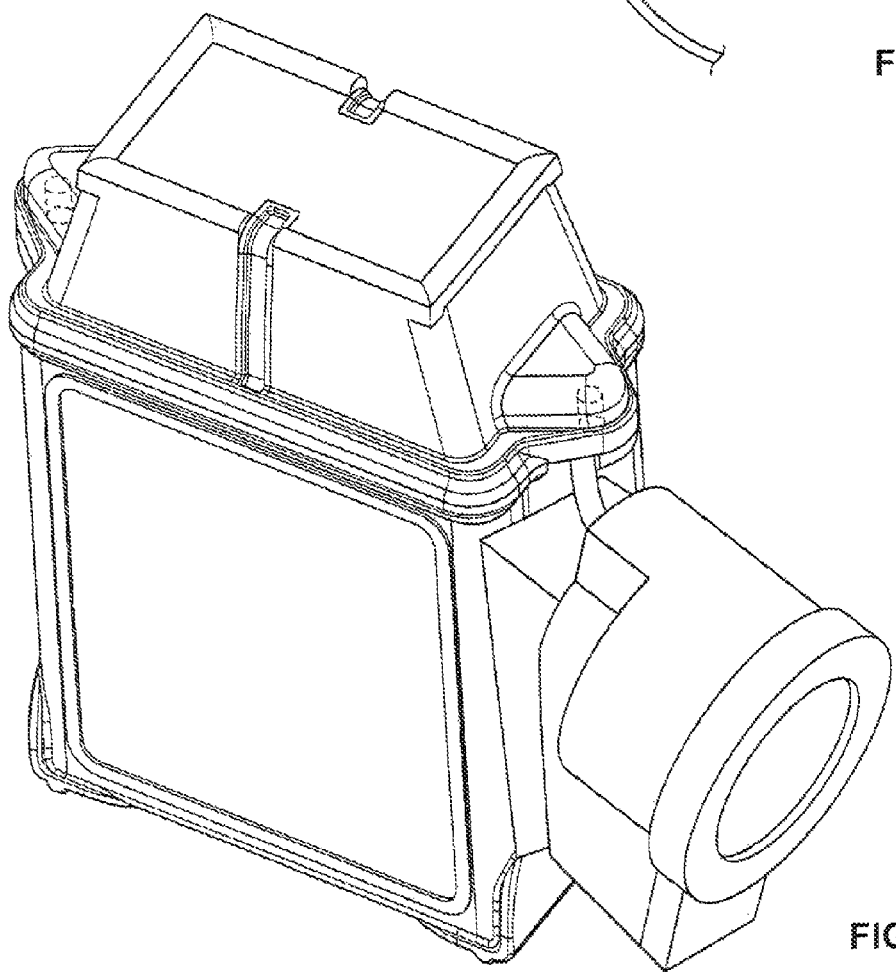
FIG. 15 is a perspective view of a handheld lamp arrangement including an embodiment of the battery pack of the invention.

The cover 8 includes a cord strain relief 28 (FIGS. 1 and 4), preferably constructed of a rubber material, that receives insulated wires (23 in FIG. 14) that attach to positive and negative posts 14a and 14b to provide power to the cap lamp (25 in FIG. 14). An example of such a cap lamp is provided in U.S. Pat. No. 4,481,458 to Lane, the contents of which are hereby incorporated by reference. Alternatively, the lamp may be directly connected to the power pack, such as a handheld lamp arrangement (FIG. 15). The cover also features elongated, transparent windows 32a and 32b (FIG. 4) which are illuminated by the LED 16 (FIGS. 1 and 2).

The operational features of the ECM 20 preferably include the charging status LED (16 in FIGS. 1 and 2), short circuit protection, a low battery warning, a soft-start feature and a 2:1 charging/discharging ratio. In addition, the ECM preferably includes a charging voltage and current converter so that the battery pack may be used with chargers originally designed for lead-acid type batteries.

Figure 5:
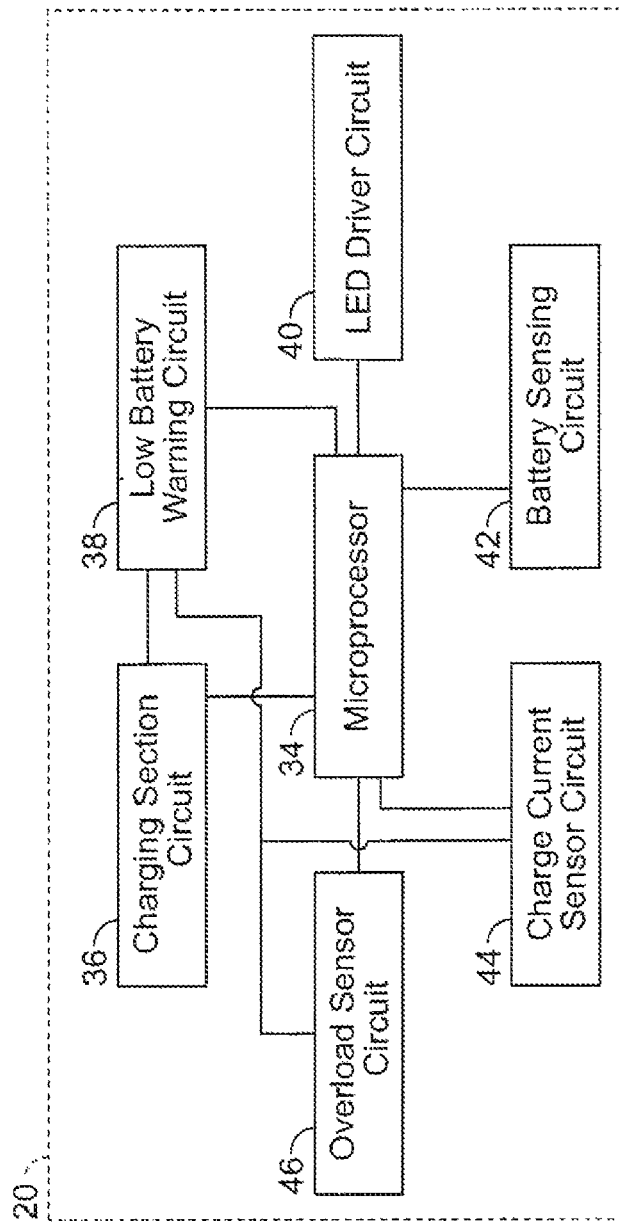
FIG. 5 is a block diagram illustrating the primary components of the electronic control module of the battery pack of FIGS. 1-4.

A block diagram illustrating the primary components and circuitry of the ECM 20 of FIGS. 1 and 2 is provided in FIG. 5. As illustrated in FIG. 5, the ECM includes a microprocessor 34. The ECM also includes a charging section circuit 36, a low battery warning circuit 38, an LED driver circuit 40, a battery sensing circuit 42, a charge current sensor circuit 44 and an overload sensor circuit 46, all of which communicate with the microprocessor 34.

Figure 6A:
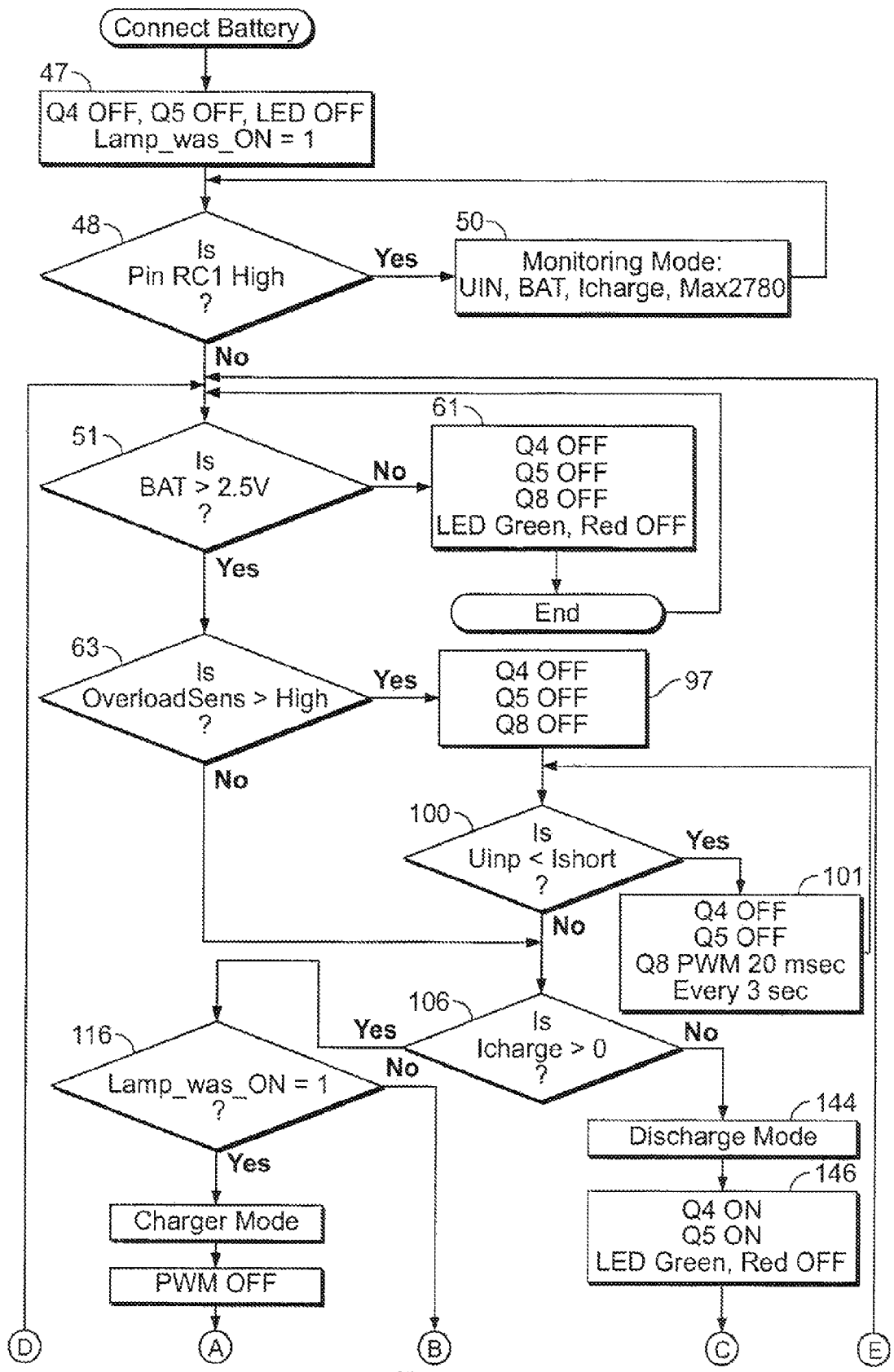
FIG. 6 is an operation flow diagram of the microprocessor of the electronic control module of FIG. 5.
Figure 6B:
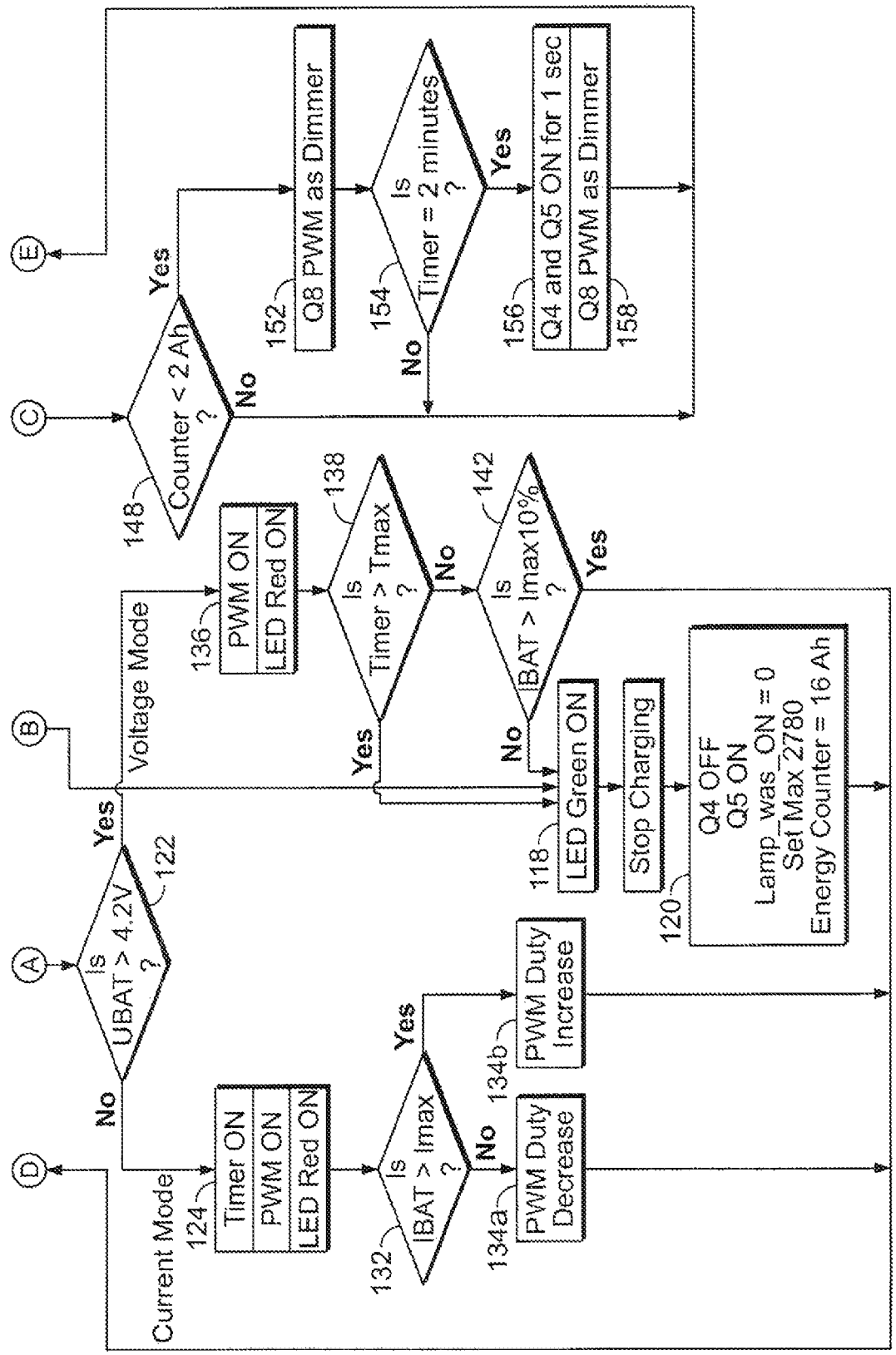
Figure 7:
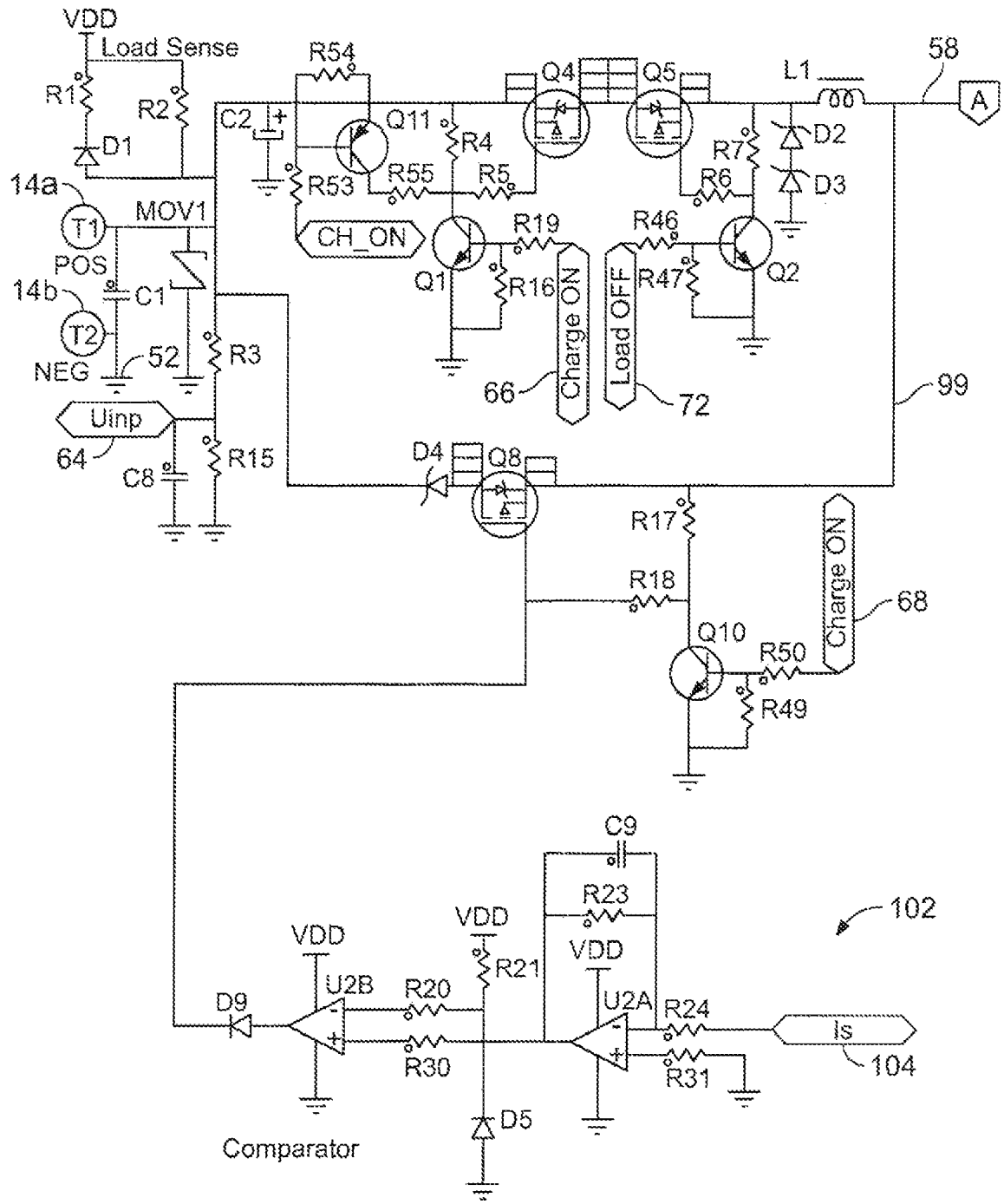
FIG. 7 is a schematic of the charging section circuit of the electronic control module of FIG. 5.

A flow chart illustrating the programming of the microprocessor 34 of FIG. 5 is provided in FIG. 6. As indicated by block 47 of FIG. 6, when microprocessor 34 is initially powered up, that is, connected to power, a number of default settings for the ECM occur. More specifically, transistors Q4 and Q5 of the charging section circuit, illustrated in FIG. 7, are turned off. As will be explained in greater detail below, transistors Q4 and Q5 of the charging section circuit are responsible for controlling current flow to and from the battery pack during charging and discharging.

In addition, the charging status LED 16 (FIGS. 1, 2 and 13) is turned off as a default setting of the ECM. The charging status LED 16 is controlled by the microprocessor via the LED driver circuit 40 (FIGS. 5 and 13) and illuminates windows 32a and 32b of the battery pack (FIG. 4) with either a red or green color to indicate charging status. More specifically, a red LED is an indication that the battery is connected to a charger and is accepting a charge current. A green LED is an indication that the battery is connected to a charger, but it is no longer accepting charge current because it is fully charged and ready for operation. The operation of the LED driver circuit will be explained in greater detail below.

A "LAMP_WAS_ON" bit that is internal to the microprocessor is also set to "1" as the default setting of the ECM. This bit is an indication of whether the fully charged battery pack was used after being charged. This prevents the battery pack from being charged if it is disconnected and reconnected to a charger without application of a load. Charging of the battery pack may occur only if the bit is set to "1."

Next, as illustrated at 48 in FIG. 6, the LED_GREEN pin of the microprocessor is checked for a high or low setting. The LED_GREEN pin is illustrated at 49 in FIG. 9 as is microprocessor 34. The high setting of the LED_GREEN pin corresponds to the charging status LED 16 being illuminated in green, and thus corresponds to the battery pack being in a fully charged condition. If this is the case, the batter pack goes into monitoring mode, as illustrated at block 50 in FIG. 6, where the battery capacity is monitored. If the battery voltage falls below a threshold due to self-discharge, and the battery pack is connected to a charger, charging restarts, as will be explained below.

Figure 13:
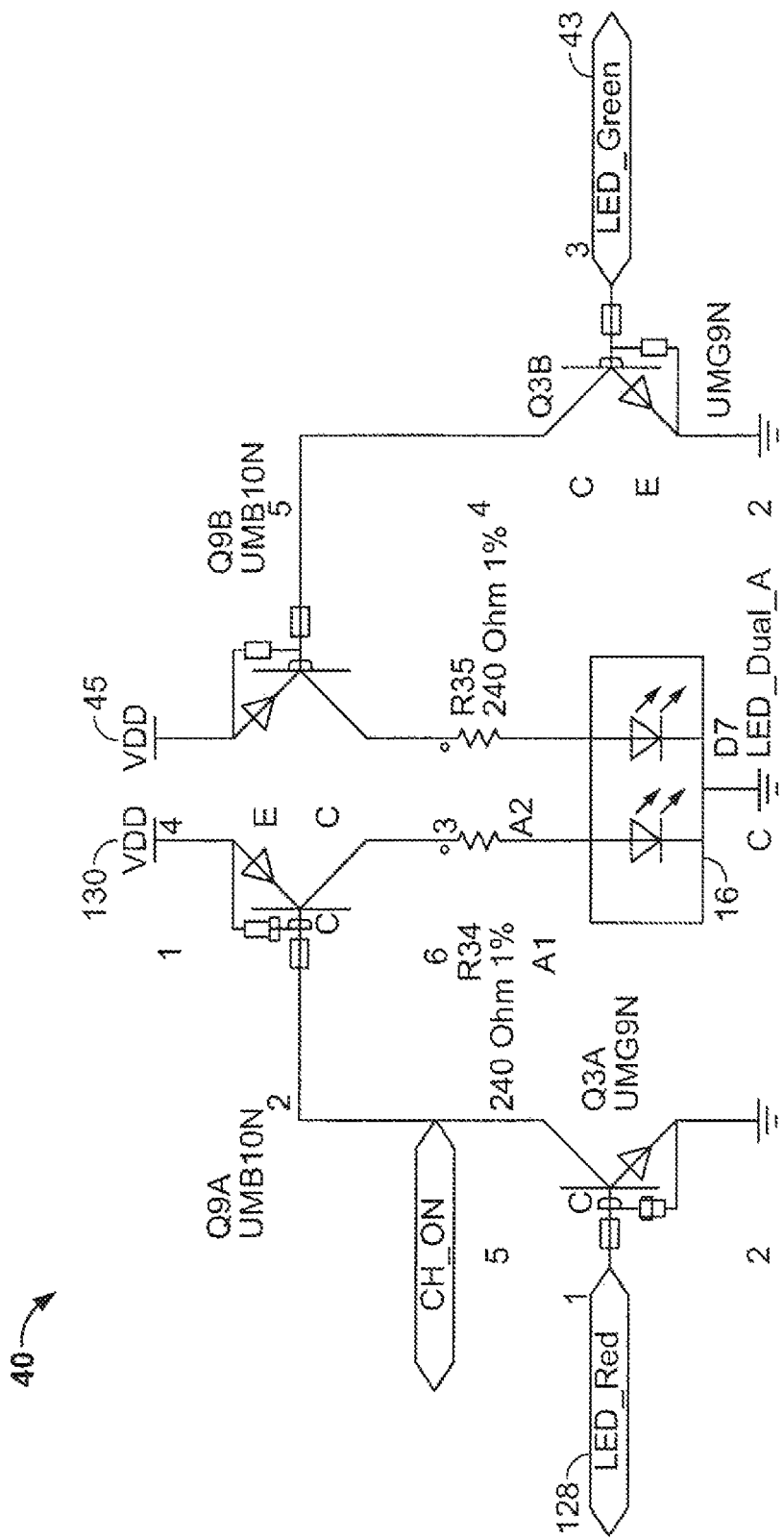
FIG. 13 is a schematic of the LED driver circuit of the electronic control module of FIG. 5.

When the LED_GREEN pin 49 (FIG. 9) of the microprocessor is set to high, this is communicated to the to the LED driver circuit 40 (FIGS. 5 and 13) via connection 43 of FIG. 13 so that, as noted above, the charging status LED is illuminated in green. Power is received by this portion of the LED driver circuit 40 by connection 45 (FIG. 13).

If the LED_GREEN pin of the microprocessor is low, the charging status LED is not illuminated in green. If this is the case, as indicated at 51 in FIG. 6, the microprocessor checks the battery pack for an over-discharged condition. More specifically, the battery sensing circuit 42 of FIG. 5 is illustrated in greater detail in FIG. 10 and features a voltage divider or measurement portion, indicated in general at 53. The voltage measurement portion 53 of FIG. 10 communicates via connection 55 with line 56 of the charging section circuit of FIG. 6, and thus the positive and negative terminals of the battery cell bundle, illustrated at 15a and 15b, respectively, in FIG. 8, and determines the battery cell voltage. The battery cell voltage is communicated by the battery sensing circuit of FIG. 10 to the microprocessor via the connection 57 (BAT) of FIG. 10 and corresponding input pin 59 (FIG. 9) of the microprocessor. If the battery cell voltage is equal to or less than 2.5V, the battery pack is in an over-discharged condition and, as indicated at 61 in FIG. 6, the charging status LED and transistors Q4, Q5 and Q8 (FIG. 6) are shut off. As will be explained in greater detail below, pulse transistor Q8 is responsible for controlling current during pulse width modulation operation of the battery pack. If the battery cell voltage is greater than 2.5V, the next step of FIG. 6 is performed by the microprocessor.

As indicated at 63 in FIG. 6, the microprocessor next checks for a fault condition, such as a short circuit or overload condition. As described previously, the ECM must handle a short circuit or overload (the term "short circuit" being used to mean either situation herein), such as caused by worn parts in the load or wires leading thereto, by causing the battery pack to go into protection mode so that the load (a cap lamp in the present example) is turned off. Prior art designs require the use to manually turn the cap lamp off and back on to reset the associated circuit prior to allowing current flow back to the cap lamp after the short circuit condition is removed. The ECM of the present invention features circuitry that automatically turns the cap lamp (or other load) back on after the short circuit condition is removed. In other words, the user does not have to manually turn the cap lamp off and back on to reset the battery pack.

With reference to FIG. 5, the automatic recovery feature is provided by the microprocessor 34, charging section circuit 36 and low battery warning circuit 38 of the ECM. As noted previously, schematics illustrating the details of an embodiment of the charging section and low battery warning circuits are provided in FIGS. 7 and 8, respectively, while a schematic illustrating the microprocessor 34 and associated circuit is provided in FIG. 9.

With reference to FIG. 7 and as noted previously, the positive and negative terminals or posts of the battery pack are illustrated at 14a and 14b, respectively. During the discharge of the battery (such as when it is powering a load/cap lamp) current from the load and post 14b flows through ground point 52 (FIG. 7) to ground point 54 (FIG. 8), through resistor R25 and negative terminal 15b of the battery cell bundle (9 in FIG. 1) into the battery cell bundle. Current from the battery cell bundle flows through battery cell bundle positive terminal 15a, line 56 (FIG. 8) and line 58 (FIG. 7). As illustrated in FIG. 7, the current traveling through line 58 encounters transistor Q5 and then transistor Q4 before traveling to the positive post of the battery pack 14a and out to the cap lamp load.

Figure 8:
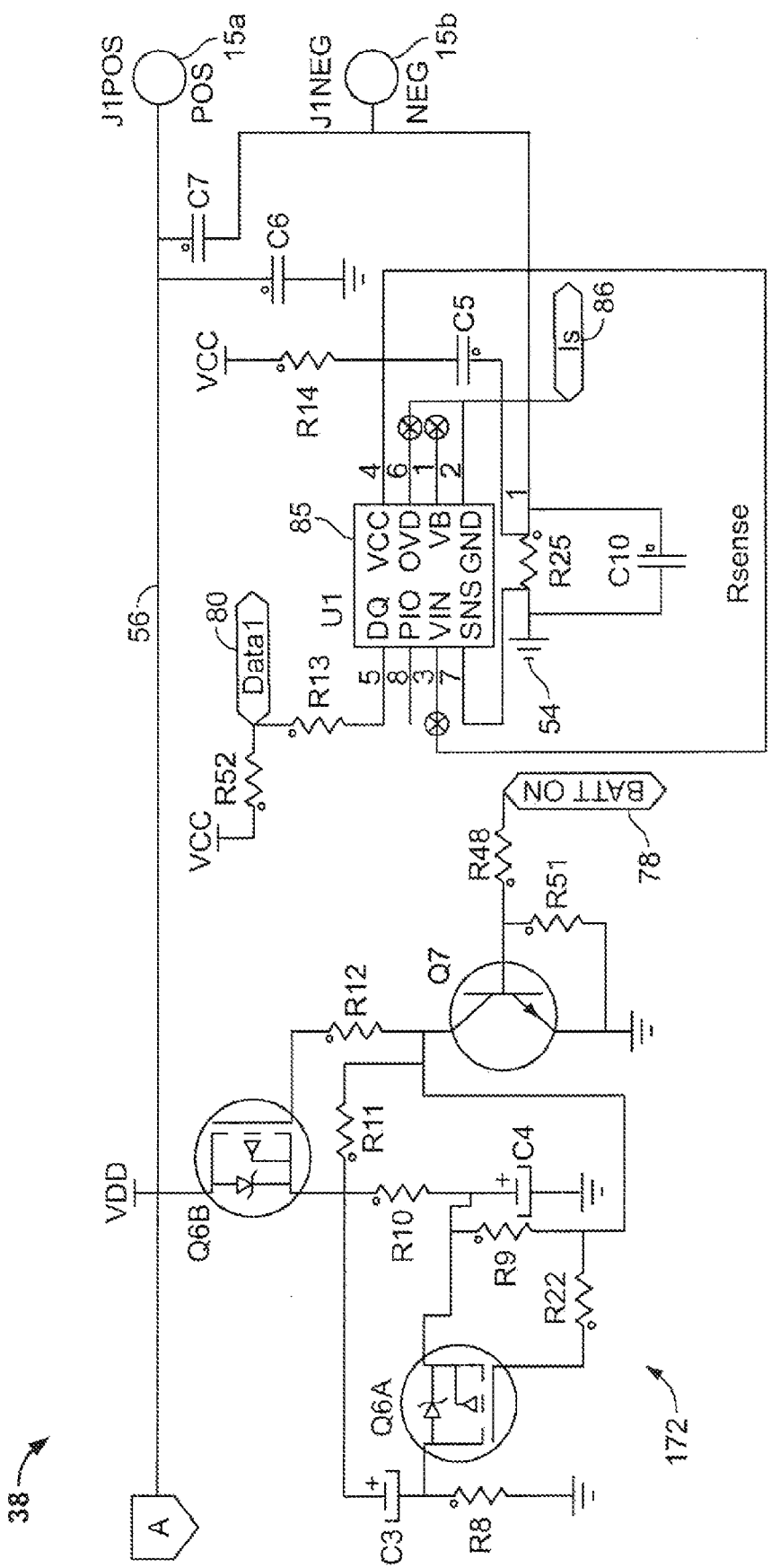
FIG. 8 is a schematic of the low battery warning/indication circuit of the electronic control module of FIG. 5.
Figure 9:
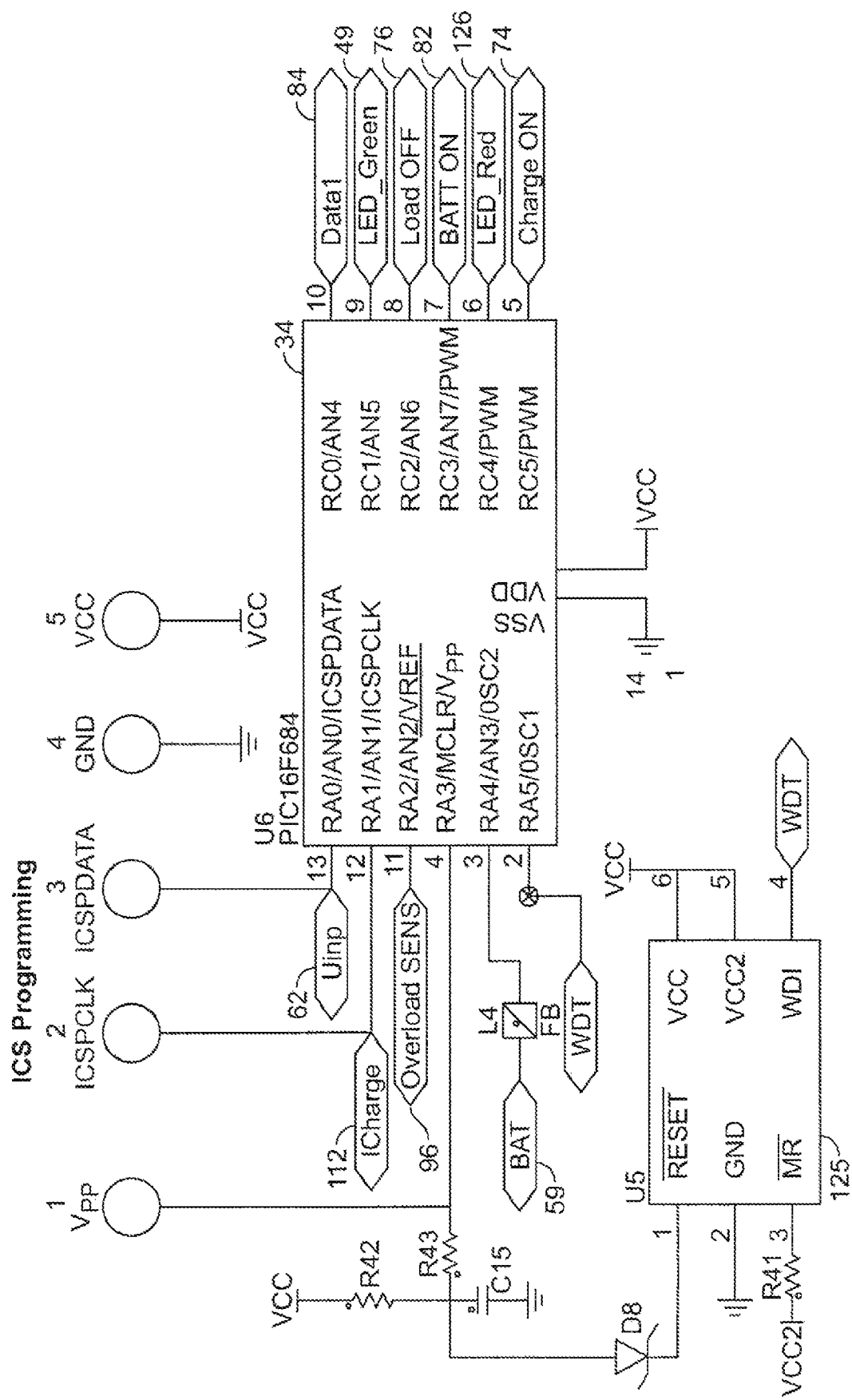
FIG. 9 is a schematic of the microprocessor and associated circuitry of the electronic control module of FIG. 5.

In addition to the microprocessor pins already described, as illustrated in FIG. 9, microprocessor 34 features a number of input and output pins which are connected to the various circuits illustrated in FIG. 5. The input pins are illustrated on the left side of the microprocessor 34 in FIG. 9 while the output pins are illustrated on the right side. The charging section circuit 36 of FIG. 7 communicates with the microprocessor voltage input pin Uinp 62 (FIG. 9) via connection 64 (FIG. 7). In addition, with reference to FIG. 7, connections 66 and 68 (CHARGE ON) and 72 (LOAD OFF) of charging section circuit 36 communicate with corresponding output pins 74 and 76 of the microprocessor 34. The low battery warning/indication circuit 38 of FIG. 8 features connections 78 (BATT ON) and 80 (DATA1) that communicate with corresponding pins 83 and 84, respectively, of the microprocessor 34 of FIG. 9.

Figure 11:
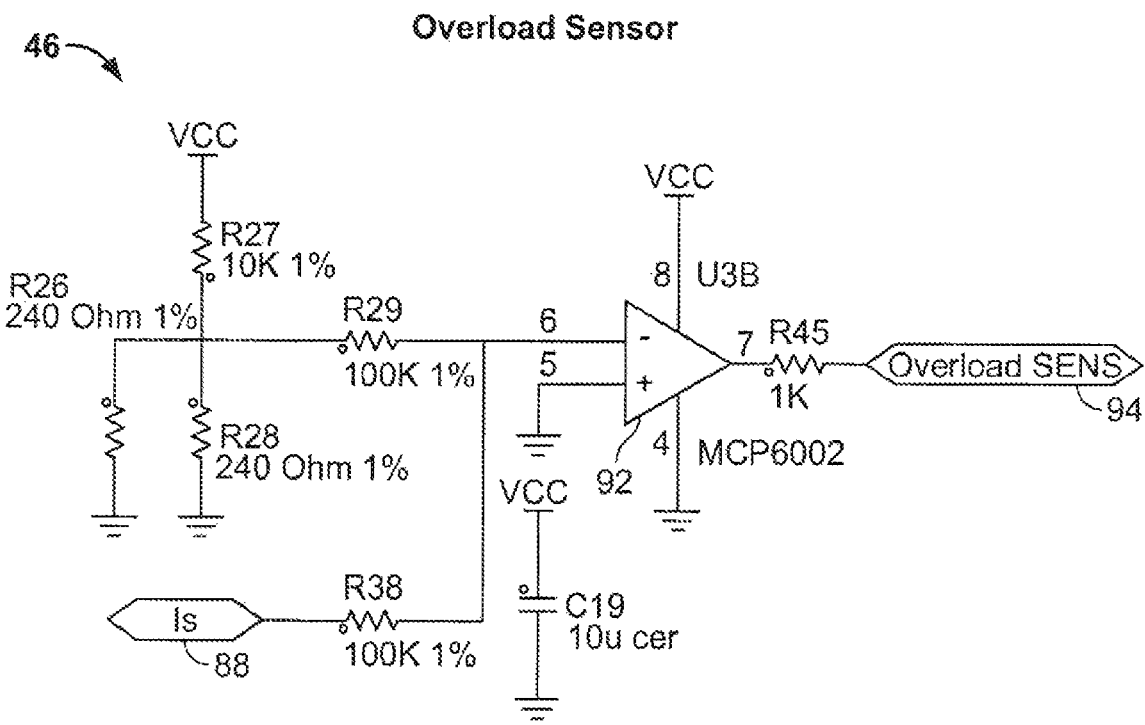
FIG. 11 is a schematic of the overload sensor circuit of the electronic control module of FIG. 5.

A coulomb counter, illustrated at 85 in FIG. 8, senses the discharge current flowing through resistor R25. The sensed current is outputted from the coulomb counter 85 through connection 86 (Is). The sensed current is monitored via overload sensor circuit 46 (FIGS. 5 and 11) as the circuit receives the sensed current through connections 86 (FIG. 8) and 88 (FIG. 11). As illustrated in FIG. 11, an operational amplifier 92 receives the sensed current from 88 and is programmed to check for the short circuit condition (indicated by a high current flow). When such a condition is detected, a signal indicating a short circuit condition is provided to the microprocessor via connection 94 (FIG. 11) and microprocessor input pin 96 (FIG. 9) so that the microprocessor input pin 96 (Overload Sens) is set to high. When conditions are normal (no short circuit), the Overload Sens input pin 96 of the microprocessor is set to low.

When a short circuit is sensed, as indicated at 63 and 97 in FIG. 6, the microprocessor turns off transistor Q5, and thus the load (cap lamp), via pin 76 (FIG. 9) and, with reference to FIG. 7, connection 72 and switch Q2 so that current may flow through line 99 and thus pulse transistor Q8. In addition, transistors Q4 and Q8 are turned off by the microprocessor via output pin 74 (FIG. 9) and, with reference to FIG. 7), connections 66 and 68 and switches Q1 and Q10.

Next, as illustrated at 100 in FIG. 6, the voltage level at the terminals of the battery pack (Uinp) is measured using connection 64 of FIG. 7 and corresponding input pin 62 (FIG. 9) of the microprocessor to determine if the short condition still exists. If so, as indicated by block 101 in FIG. 6, pulse width modulation using pulse transistor Q8 (FIG. 7) occurs until the load/cap lamp turns on. The pulsing of transistor Q8 allows small amounts of current to flow, all being sensed by the comparator circuit, indicated in general at 102 in FIG. 7. If the short circuit is still present, the comparator 102 will detect a rapid current rise when transistor Q8 is turned on. The microprocessor will be so signaled by the comparator through the overload sensor circuit as connection 104 (FIG. 7) of the comparator communicates with connection 88 of the overload sensor circuit (FIG. 11). When the short circuit is still present, the microprocessor will continue to pulse transistor Q8 while sensing the current.

When the short circuit is removed, the microprocessor turns transistor Q5 on so that full current is restored to the cap lamp. As a result, the circuitry provides a self-resetting mechanism so that when the battery is shut down due to a short circuit, the load/cap lamp is automatically re-powered when the short circuit or is removed. No additional action is required by the user.

While the ECM of the present invention offers an automatic recovery feature for short circuits, a battery pack or load may optionally also feature a push-button or switch that resets the system and re-powers the load after the battery is shut down due to a short circuit when the short circuit is removed.

The charging section circuit 36 of FIGS. 5 and 7 of the ECM also preferably provides the battery pack with a "soft-start" feature to avoid a massive inrush of current into the cap lamp bulb at start up, and thus increase bulb life. When the cap lamp is shut off, the microprocessor shuts off transistors Q4 and Q5 so that when the cap lamp is switched on or connected to the battery pack terminals, current must flow through branch 99 of FIG. 7. The ramp-up of electrical current (soft-start) is accomplished by pulse width modulation via transistor Q8 as controlled by the microprocessor 34. More specifically, transistor Q8 is controlled in this manner as current flows to the cap lamp until fall current is achieved and communicated to the microprocessor. Once full current is achieved, transistors Q4 and Q5 are turned on by the microprocessor and transistor Q8 is turned off. Full current then flows to the cap lamp as described above.

Figure 12:
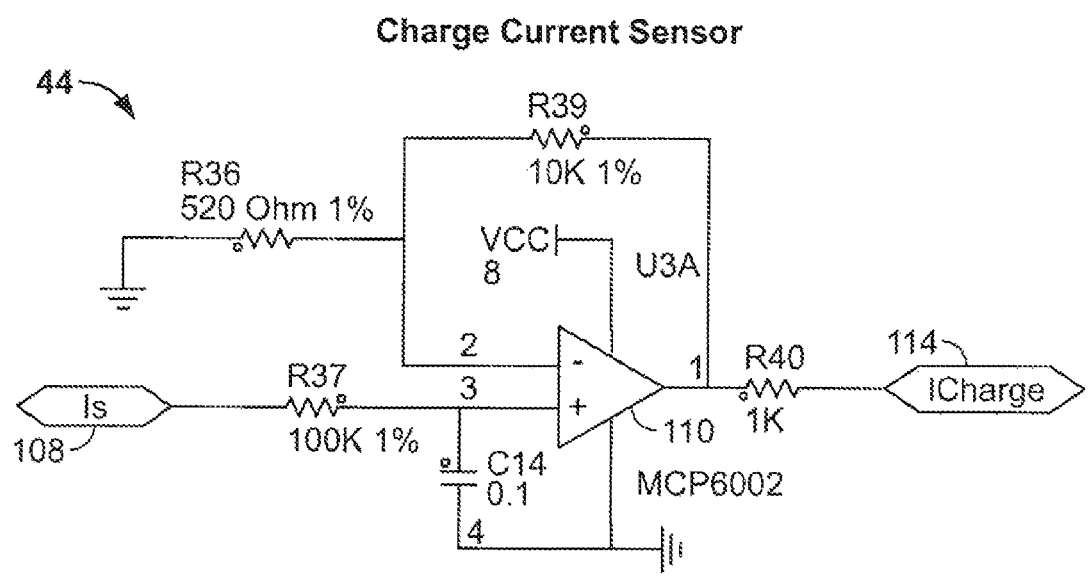
FIG. 12 is a schematic of charge current sensor circuit of the electronic control module of FIG. 5.

Returning to FIG. 6, if no short circuit condition exists, the microprocessor checks for the presence of a charging current, as indicated at 106. More specifically, a charge current circuit sensor circuit 44 (FIGS. 5 and 12) receives the current sensed in the circuit of FIGS. 7 and 8 via connections 86 (FIG. 8) and 108 (FIG. 12). If a charge current is sensed, with the assistance of operational amplifier 110 of FIG. 12, input pin 112 (ICharge) of the microprocessor (FIG. 9) is notified via connection 114 (FIG. 12) so that ICharge>0 for purposes of 106 in FIG. 6. The flow chart then branches to the charge mode, as illustrated by FIG. 6.

For recharging, the battery pack is placed in a charging rack having a connector that engages a corresponding charging connection on the cap lamp. Such charging racks are well-known in the art. During recharging, the charging current enters the battery pack through the positive post 14*a* (FIG. 7) of the battery pack and travels the reverse of the battery pack discharge route described above so that the charging current passes through transistor Q4 and then transistor Q5. The charging current exits the battery pack through negative post 14*b*. The charge ratio for the battery pack preferably is 2:1. Therefore, for every twelve hours of use, it will take six hours to recharge the battery pack.

As illustrated at 116 in FIG. 6, the LAMP_WAS_ON internal bit of the microprocessor 34 is again checked to ensure that it is set to 1, so that charging is permitted. If the LAMP_WAS_ON bit is set to 0, the ECM is set to default for discharge mode whereby the charging status LED is illuminated in green, Q4 is turned off and Q5 is turned on as indicated at 118 and 120 in FIG. 6. In addition, as indicated at 120, the coulomb counter count is set to 16 amp hours (Ah) as an indication of frill charge for the battery pack via output pin 84 (FIG. 9) of the microprocessor and connection 80 of FIG. 8. Flow then branches back to step 51, as illustrated in FIG. 6, so that the top portion of the flow chart, including the short circuit check section, is performed.

If LAMP_WAS_ON=1, the battery pack has been discharged an unknown amount and must go into active charge mode and the next step, 122 of FIG. 6, is performed. At 122, the battery cell voltage is checked by the microprocessor (via measurement portion 53 of the circuit of FIG. 10, connection 57 of FIG. 10 and microprocessor input pin 59 of FIG. 9). If the battery cell voltage is less than or equal to 4.2V, the flowchart branches to current mode, as illustrated in FIG. 6. In current mode, as indicated at 124, a timer (125 in FIG. 9) is started and the charging status LED (16 in FIGS. 1, 2 and 13) is illuminated in red. With regard to the latter, the microprocessor sends a signal to the LED driver circuit 40 (FIGS. 5 and 13) via microprocessor output pin 126 (FIG. 9) and connection 128 of FIG. 13. Power is received by this portion of the LED driver circuit by connection 130. In addition, during current mode, pulse width modulation via resistor Q8 is activated.

As indicated at 132 in FIG. 6, the charging current Ibat (or Icharge) is monitored by the microprocessor. This occurs via the charge current sensor circuit 44 of FIGS. 5 and 12 and input pin 112 of the microprocessor (FIG. 9). The microprocessor adjusts the charging current by increasing or decreasing the pulse width modulation duty cycle of transistor Q8 (FIG. 7), as indicated by 134*a* and 134*b* in FIG. 6. As a result, a 2.5A mean charge current is achieved while the battery charging state is at a constant current. Flow then branches back to step 51, as illustrated in FIG. 6, so that the top portion of the flow chart, including the short circuit check section, is performed. The current mode of charging occurs until the battery cell voltage is greater than 4.2V, at which time voltage mode is initiated.

As illustrated at 136 in FIG. 6, the pulse width modulation of transistor Q8 continues and the charging status LED is illuminated in red during the voltage mode of charging. As indicated at 138, the timer 125 (FIG. 9), which was turned on at 124 of FIG. 6, is checked to determine if it is greater than the timeout value (Tmax). If so, as illustrated in FIG. 6, the charging status LED is illuminated in green, charging is stopped and the discharge mode is initialized as indicated at 118 and 120 in FIG. 6. The timer is used for safety purposes and voltage mode rarely terminates due to the timer exceeding the timeout value.

If the timeout value has not been exceeded at 138 in FIG. 6, the charging current is checked at 142 by the microprocessor to determine if it is greater than the value Imax10%. Imax10% is equal to 10% of the maximum constant current (Imax) in the current mode. This is the typical termination mechanism for charging. If the charging current is not greater than Imax10%, the charging status LED is illuminated in green, charging is stopped and the discharge mode is initialized as indicated at 118 and 120 in FIG. 6.

Returning to 106 in FIG. 6, if no charging current is present, the microprocessor, and thus the ECM, enters the discharge mode, as indicated at 144. As indicated by 146 in FIG. 6, capacitors Q4 and Q5 (FIG. 7) are turned on and the charging status LED is illuminated in green. Next, as indicated at 148, the coulomb counter (85 in FIG. 8) count is checked by the microprocessor as an indication of the charge level of the battery pack. If the count is greater than or equal to 2 Ah, normal discharge mode continues and processing loops back to step 51 as illustrated in FIG. 6. As a result, a short circuit and general monitoring mode is performed continuously, whether the battery pack is in charge or discharge mode.

If the coulomb counter count is less than 2 Ah, the battery pack goes into low power mode where a low battery charge warning is provided. More specifically, as indicated at 152 in FIG. 6, the microprocessor turns transistors Q4 and Q5 (FIG. 7) off and operates Q8 in pulse width modulation mode so that the discharge of the battery pack occurs at low power. This causes the cap lamp load to dim. The dimmed light provides extended time for a miner to depart from the mine and obtain a fully charged battery pack. In addition, as indicated at 154 and 156 in FIG. 6, every two minutes the microprocessor turns on transistors Q4 and Q5 for one second so that the cap lump flashes with full power, which acts as a warning of a low battery charge condition. As indicated at 158, operation of Q8 in pulse width modulation mode resumes after the flash so that the cap lamp is again dim.

Figure 10:
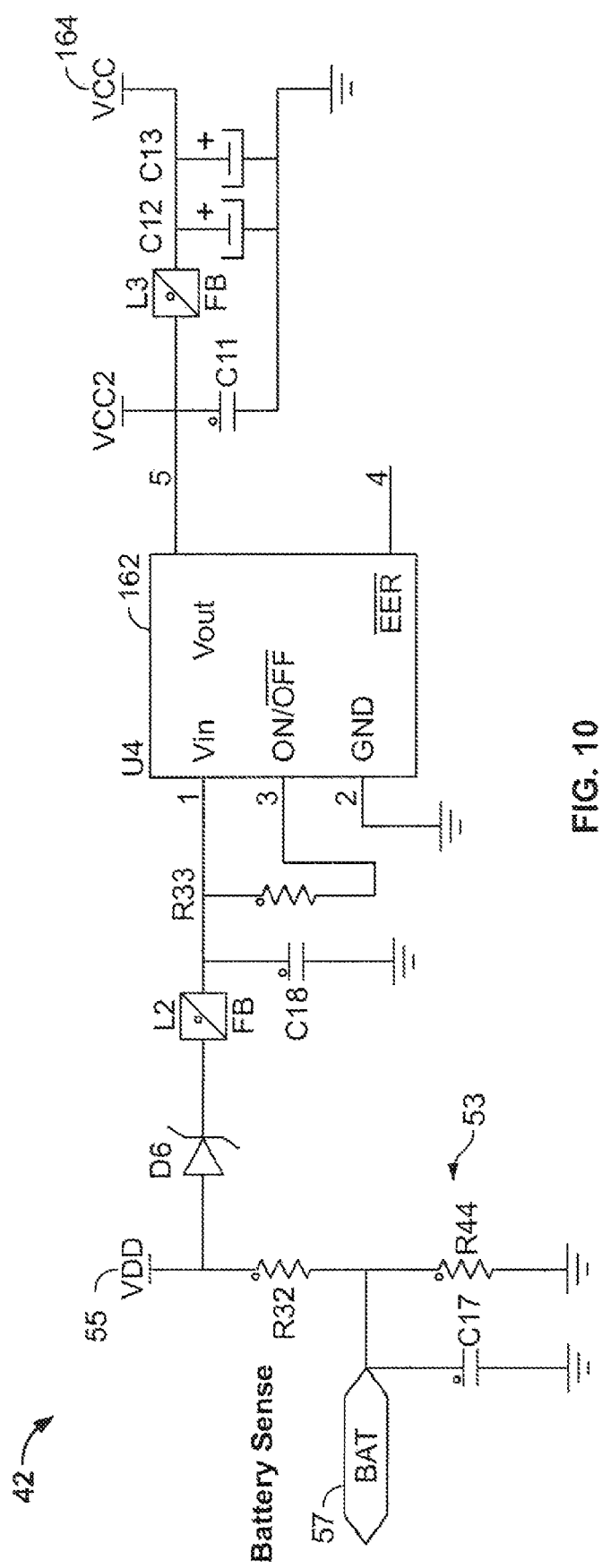
FIG. 10 is a schematic of the battery sensing circuit of the electronic control module of FIG. 5.

The microprocessor 34 of FIGS. 5 and 9 requires a constant voltage to run. This is provided by the voltage regulator 162 of the circuit of FIG. 10. More specifically, as noted previously, the circuit of FIG. 10 receives voltage from the battery cell bundle (VDD) via connection 55. This is converted by the voltage regulator 162 to voltage (VCC) that is provided to the microprocessor, and other components of the ECM such as the coulomb counter 85 of FIG. 8 and the operational amplifiers 92 and 110 of FIGS. 11 and 12, respectively, via connection 164 (FIG. 10).

As noted previously, the battery pack is provided with a protection circuit illustrated at 15 in FIGS. 2 and 3 that provides under-voltage cutoff, over-voltage cutoff and over-current cutoff protection. The protection circuit therefore acts as a backup to the ECM circuitry and microprocessor programming discussed with respect to FIG. 6. As examples only, an over-voltage condition may occur if the protection circuit detects a voltage of 4.35V or greater, while an under-voltage condition may occur if the protection circuit detects a voltage of 2.5V or less. An over-current condition may exist if the current exceeds 4.5A. If any of these conditions exist, the protection circuit is tripped like a circuit breaker. As a result, the protection circuit must be reset before the battery pack may be used again.

The protection circuit is reset using the capacitor bank circuit indicated in general at 172 in FIG. 8. Transistor QB6 (FIG. 8) permits energy to flow into the capacitor bank circuit 172, but does not permit it to escape until so directed by the microprocessor. As a result, energy is stored in the capacitor bank circuit 172. When the protection circuit (15 of FIGS. 2 and 3) is tripped, input pin 59 (FIG. 9) of the microprocessor goes to zero and the microprocessor signals the capacitor bank circuit 172 to release the stored energy via connection 78 (FIG. 8) and microprocessor output pin 82 (FIG. 9). This release of energy causes the battery protection circuit to reset.

The voltages, currents and times of FIG. 6 are presented as examples only and are in no way to limit the scope of the invention.

While the preferred embodiments of the invention have been shown and described, it will be apparent to those skilled in the art that changes and modifications may be made therein without departing from the spirit of the invention, the scope of which is defined by the appended claims.

What is claimed is:

1. A battery pack for powering a cap lamp comprising:
   a. a housing;
   b. a battery cell positioned within said housing;
   c. a pair of terminals attached to the battery cell and adapted to provide power to a cap lamp;
   d. charging circuitry positioned within said housing and attached to said battery cell, said charging circuitry providing a charging current to the battery cell when the battery pack is connected to a charger; and
   e. a microprocessor positioned within said housing and operatively connected to the charging circuitry.

2. The battery pack of claim 1 wherein the microprocessor maintains a constant charging current.

3. The battery pack of claim 2 wherein the charging circuitry includes a transistor that is in communication with the microprocessor to maintain the constant charging current.

4. The battery pack of claim 3 wherein the microprocessor uses pulse width modulation of the transistor to maintain the constant charging current.

5. The battery pack of claim 1 wherein the microprocessor is adapted to configure the battery pack to provide low power to the cap lamp, so as to dim the cap lamp, and to configure the system to provide full power to the cap lamp.

6. A cap lamp system comprising:
   a. a housing;
   b. a battery cell positioned within said housing;
   c. a pair of terminals attached to the battery cell;
   d. a cap lamp attached to the pair of terminals so as to receive power from the battery cell;
   e. charging circuitry positioned within said housing and attached to said battery cell, said charging circuitry providing a charging current to the battery cell when the charging circuitry is connected to a charger; and
   f. a microprocessor positioned within said housing and operatively connected to the charging circuitry.

7. The cap lamp system of claim 6 wherein the microprocessor maintains a constant charging current.

8. The cap lamp system of claim 7 wherein the charging circuitry includes a transistor that is in communication with the microprocessor to maintain the constant charging current.

9. The cap lamp system of claim 8 wherein the microprocessor uses pulse width modulation of the transistor to maintain the constant charging current.

10. The cap lamp system of claim 6 wherein the microprocessor is adapted to configure the cap lamp system to provide low power to the cap lamp, so as to dim the cap lamp, and to configure the cap lamp system to provide full power to the cap lamp.

* * * * *